(12) United States Patent
Kumai (10) Patent No.: US 7,729,340 B2
(45) Date of Patent: Jun. 1, 2010

(54) IP TELEPHONE APPARATUS

(75) Inventor: Hisao Kumai, Kanagawa (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 1778 days.

(21) Appl. No.: 10/848,582

(22) Filed: May 19, 2004

(65) Prior Publication Data

US 2005/0002500 A1 Jan. 6, 2005

(30) Foreign Application Priority Data

May 20, 2003 (JP) ............................. 2003-141841

(51) Int. Cl.
*H04L 12/66* (2006.01)

(52) U.S. Cl. .................. 370/352; 370/338; 370/389; 379/88.17; 379/268; 455/415; 455/445; 455/456.1; 455/567

(58) Field of Classification Search .............. 370/352, 370/338, 389; 455/415, 445, 417, 418, 456.1, 455/566, 567; 379/88.13, 88.17, 88.21, 142.04, 379/211.02, 212.01, 268
See application file for complete search history.

(56) References Cited

U.S. PATENT DOCUMENTS

| | | | | |
|---|---|---|---|---|
| 4,569,041 | A * | 2/1986 | Takeuchi et al. ............. | 370/352 |
| H1641 | H * | 4/1997 | Sharman ...................... | 370/338 |
| 5,724,411 | A * | 3/1998 | Eisdorfer et al. ........... | 379/93.23 |
| 6,141,341 | A * | 10/2000 | Jones et al. .................. | 370/352 |
| 6,377,576 | B1 * | 4/2002 | Zwick et al. ................. | 370/389 |
| 6,560,216 | B1 * | 5/2003 | McNiff et al. ............... | 370/349 |
| 6,614,781 | B1 * | 9/2003 | Elliott et al. ................ | 370/352 |
| 6,650,901 | B1 * | 11/2003 | Schuster et al. ........... | 455/456.1 |
| 6,711,155 | B1 * | 3/2004 | Himbeault et al. .......... | 370/352 |
| 6,732,188 | B1 * | 5/2004 | Flockhart et al. ............ | 709/245 |
| 6,798,768 | B1 * | 9/2004 | Gallick et al. ............... | 370/352 |
| 6,819,664 | B1 * | 11/2004 | Jeong ......................... | 370/352 |
| 6,977,923 | B1 * | 12/2005 | Hagebarth ................... | 370/353 |
| 7,161,925 | B2 * | 1/2007 | Wallenius et al. ........... | 370/338 |
| 7,184,533 | B1 * | 2/2007 | Shaffer et al. .......... | 379/211.01 |
| 7,260,203 | B2 * | 8/2007 | Holt et al. .............. | 379/211.02 |
| 7,269,627 | B2 * | 9/2007 | Knauerhase ................ | 709/206 |
| 7,302,054 | B1 * | 11/2007 | McNiff et al. ............... | 379/268 |
| 7,392,191 | B2 * | 6/2008 | Odinak ....................... | 704/270 |
| 7,519,047 | B1 * | 4/2009 | Macaulay et al. ........... | 370/352 |
| 2002/0123333 | A1 * | 9/2002 | Sato ........................... | 455/415 |

(Continued)

FOREIGN PATENT DOCUMENTS

JP 9-233545 9/1997

(Continued)

*Primary Examiner*—Gerald Gauthier
(74) *Attorney, Agent, or Firm*—Nixon & Vanderhye, P.C.

(57) ABSTRACT

In conventional telephone services, methods of response to a call in cases where the destination caller cannot answer the call are limited, such as by playing back an answering machine message or transferring the call to another telephone system in a rigid manner. In such systems, there is no flexibility in choosing the manner of response depending on the situation of the destination caller. The example systems and methods described herein enable the response method to be automatically selected depending on user's current position information in an Internet telephone system in which voice data is transmitted and received via the Internet. The user registers response methods associated with network addresses in a database, and the user's current position is determined from the IP address.

19 Claims, 6 Drawing Sheets

U.S. PATENT DOCUMENTS

| | | |
|---|---|---|
| 2003/0070067 A1 | 4/2003 | Saito |
| 2003/0128691 A1* | 7/2003 | Bergman et al. ............. 370/352 |
| 2004/0190495 A1* | 9/2004 | White et al. ................. 370/352 |
| 2005/0152363 A1* | 7/2005 | Malik et al. ................. 370/389 |
| 2006/0142012 A1* | 6/2006 | Kirchhoff et al. ........... 455/445 |
| 2007/0032225 A1* | 2/2007 | Konicek et al. ............. 455/417 |
| 2007/0043828 A1* | 2/2007 | Famolari et al. ............ 709/219 |
| 2007/0173266 A1* | 7/2007 | Barnes .................... 455/456.1 |
| 2007/0189489 A1* | 8/2007 | Carnazza et al. ....... 379/211.02 |

FOREIGN PATENT DOCUMENTS

| | | |
|---|---|---|
| JP | 09233545 A * | 9/1997 |
| JP | 09-321914 | 12/1997 |
| JP | 11-103348 | 4/1999 |
| JP | 2003-101570 | 4/2003 |
| JP | 2003-101610 | 4/2003 |

* cited by examiner

| POSITION INFORMATION TABLE | | |
|---|---|---|
| NETWORK ADDRESS | LOCATION | RESPONSE METHOD |
| LIVING ROOM NETWORK | LIVING ROOM A | ANSWER CALL |
| CONFERENCE ROOM NETWORK | CONFERENCE ROOM NO. 1 | RESPONSE MESSAGE OF "ON CONFERENCE" TYPE |
| DINING ROOM NETWORK | DINING ROOM | RESPONSE MESSAGE OF "ON MEAL" TYPE |

FIG. 4

| TIME INFORMATION TABLE | | |
|---|---|---|
| DATE INFORMATION | TIME INFORMATION | PLAN |
| MAR. 7 | 10:00~12:00 | PROMOTION CONFERENCE |
| MAR. 7 | 15:00~16:00 | MEETING WITH A SUPPLIER |
| MAR. 8 | 9:00~11:00 | INTERNAL MEETING |
| MAR. 9 | 13:00~14:00 | PROJECT CONFERENCE |

FIG. 5

TIME INFORMATION TABLE

| GROUP ID | NAME OF REGISTERED PERSONNEL | DATE INFORMATION | TIME INFORMATION | PLAN | IP TELEPHONE | TRANSFER PRIORITY | CURRENT POSITION |
|---|---|---|---|---|---|---|---|
| A | DEPARTMENT MANAGER A | MAR. 7 | 10:00~12:00 | PROMOTION CONFERENCE | xxx-xxxx-xxxx | 4 | IN THE ROOM |
| A | SECTION CHIEF B | MAR. 7 | 15:00~16:00 | MEETING WITH A SUPPLIER | xxx-xxxx-xxxx | 2 | IN THE ROOM |
| A | SUBSECTION CHIEF C | MAR. 7 | 9:00~11:00 | INTERNAL MEETING | xxx-xxxx-xxxx | 1 | IN THE ROOM |
| A | CLERK D | MAR. 7 | | | xxx-xxxx-xxxx | 3 | MEETING CORNER |
| A | USER | MAR. 7 | | | xxx-xxxx-xxxx | - | CONFERENCE ROOM A |
| B | DEPARTMENT MANAGER E | MAR. 7 | | | xxx-xxxx-xxxx | | IN THE ROOM |
| . | . | . | . | | . | . | . |
| . | . | . | . | | . | . | . |
| C | DEPARTMENT MANAGER F | MAR. 7 | | | xxx-xxxx-xxxx | | IN THE ROOM |
| . | . | | | | . | . | . |
| . | . | | | | . | . | . |

| URGENCY | RESPONSE METHOD |
|---|---|
| A | ANSWER CALL |
| B | TRANSFER TO A GROUP MEMBER |
| C | REFER TO RESPONSE METHOD TABLE |
| D | TRANSMIT RESPONSE MESSAGE FORM DATA |

FIG. 8

IP TELEPHONE APPARATUS

This Nonprovisional application claims priority under 35 U.S.C. §119(a) on Patent Application No. 2003-141841 A filed in Japan on May 20, 2003, the entire contents of which are hereby incorporated by reference.

BACKGROUND OF THE INVENTION

1. Technical Field

The present invention relates to an IP telephone apparatus using VoIP, and particularly to its reception functions.

2. Background Art

Continuous Internet connection services utilizing broadband technologies such as ADSL (Asymmetric Digital Subscriber Line) are now widespread. Progress has also been made in the VoIP (Voice over Internet Protocol) technology, in which voice is transmitted in accordance with IP (Internet Protocol). As a result, IP telephone based on the Internet is now commonly utilized. IP telephone provides for three modes of communication, namely communications between personal computers, communications between a personal computer and an ordinary telephone machine, and communications between ordinary telephone machines.

Figure 8:
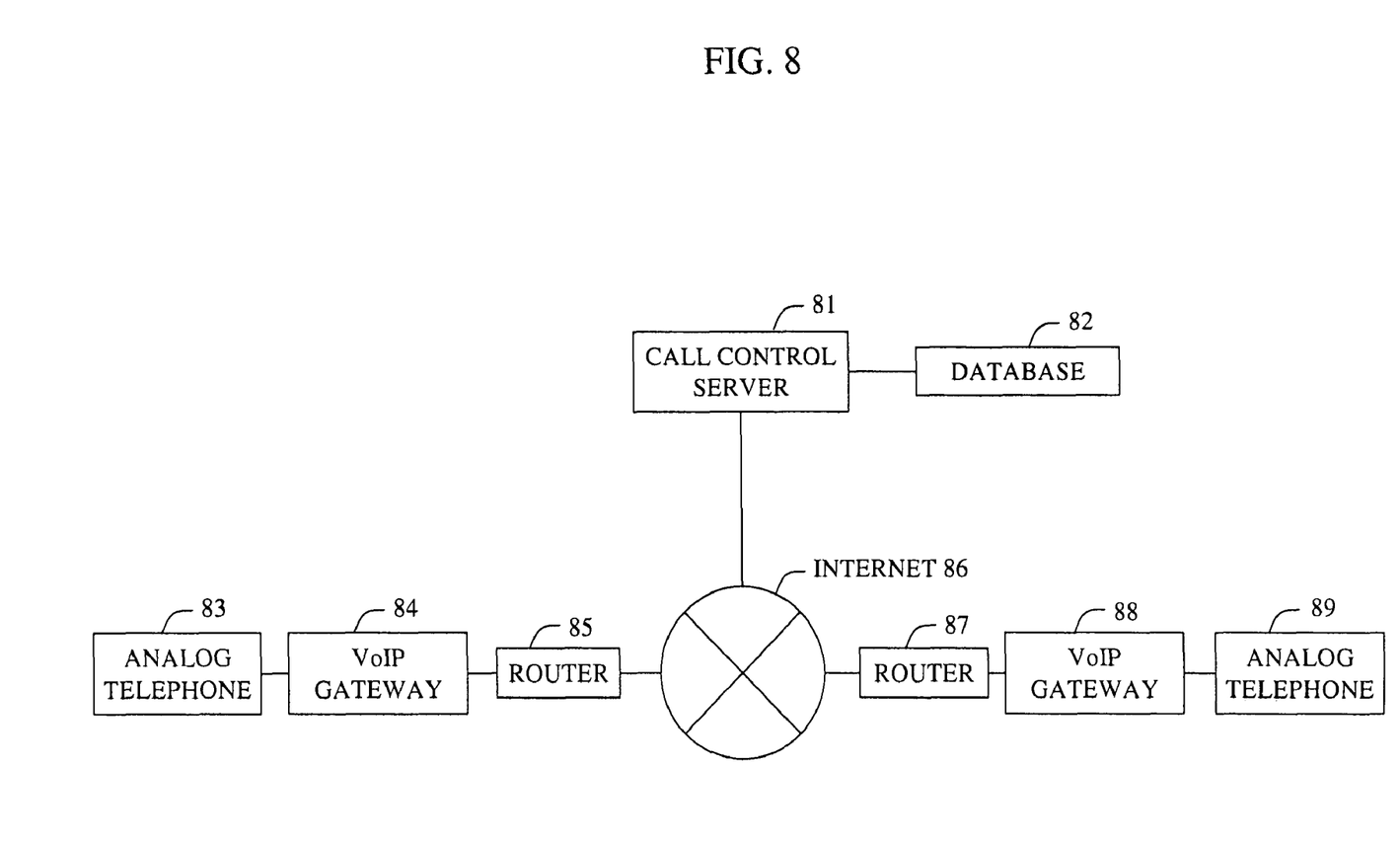
FIG. 8 shows a functional block diagram of the conventional IP telephone system.

Now referring to FIG. 8, an IP telephone system will be described in connection with the case that a phone call is made from an analog telephone 83 on the call originating side to another analog telephone 89 on the call destination side. Analog telephone 83 on the call originating side converts voice into an analog signal and transmits it to a VoIP gateway 84. VoIP gateway 84 converts the analog signal into a digital signal in order to generate an IP packet signal. The IP packet signal is sent out via a router 85 to the IP network, where the IP packet signal is transferred successively while its destination IP address is referred to in the same manner as in the case of a conventional IP packet. The IP packet eventually arrives at a router 87 on the call destination side.

Router 87 on the call destination side transmits the IP packet signal to a VoIP gateway 88 on the call destination side. VoIP gateway 88 converts the digital signal into an analog signal, which is opposite to the operation of VoIP gateway 84 on the call originating side. The analog signal is then transmitted to analog telephone 89 on the call destination side, which converts the analog signal into a voice signal.

Analog telephone 83 and VoIP gateway 84 may be substituted by a personal computer or a mobile communications terminal equipped with IP telephone software, or an IP telephone machine.

In the IP telephone system, there is provided a call control server 81 for performing a "call control," as shown. Call control server 81 includes a database 82 that provides a correspondence table between telephone numbers and IP addresses. Call control server 81 has the functions of verifying VoIP gateways 84 and 88 as well as the user, managing telephone numbers and IP addresses, and managing accounting information, for example. VoIP gateways 84 and 88 perform the "call control," such as calling the other party and managing communications. The "call control" employs a "call control protocol." Various kinds of call control protocols are known, such as H.323, SIP, and MEGACO.

A call control sequence will be briefly described. Upon reception of a call originating from analog telephone 83 on the call originating side, VoIP gateway 84 on the call originating side communicates with call control server 81 to make sure that it is possible to communicate with the call destination side and then exchanges information regarding the conversion of a telephone number and an IP address, for example. Then, call control server 81 communicates with VoIP gateway 88 on the call destination side to see if it is possible to communicate with the call destination side, for example. If it is confirmed that the call destination side can receive the call, the call from the call originating side to the call destination side is made, followed by an actual conversation and an exchange of control information such as call session management information.

Currently available telephone machines, such as mobile phones or fixed phones, are provided with a variety of functions, in addition to the voice call function. For example, some phones are capable of changing the ringtone depending on the originating caller by utilizing their own telephone directory. In case that the destination caller cannot receive the call, a response may be made by an answerphone function provided in the telephone. Instead of the answerphone function provided in the telephone, an answerphone service provided by a telephone service provider may be utilized. Some telephone service providers offer a service of transferring a call to a pre-designated telephone number (of a cellular phone, fixed phone, or PHS, for example).

(Patent Document 1)
JP Patent Publication (Kokai) No. 9-321914 A (1997)
(Patent Document 2)
JP Patent Publication (Kokai) No. 11-103348 A (1999)

SUMMARY OF THE INVENTION

The answerphone systems utilized in conventional telephone systems (fixed telephones, mobile phones, PHS, IP telephones, etc.) are only capable of transmitting an answerphone message to the originating caller or transmitting a call to a predetermined transfer destination. In this way, however, many situations on the call destination side cannot be properly handled.

For example, someone working in an office might move from one place to another in the office frequently during working hours for conferences, meetings, meals, and so on. A call to such a person cannot be adequately handled by the conventional answerphone systems. Further, in the conventional answerphone systems, the response method on the call destination side cannot be selected depending on the position of the originating caller.

It is therefore the object of the invention to enable the response method on the call destination side to be switched depending the position or situation of a call originating terminal or a call termination terminal.

The invention provides an IP telephone apparatus comprising:

an input portion via which a user sets a response method and controls the originating call or destination call;

a display portion for displaying the response method which is set by the user and a received message;

a VoIP portion for controlling voice call according to VoIP; and an automatic response switching portion for switching a response method upon reception of a call. The automatic response switching portion is adapted to perform a reception process by referring to a response method table indicating the relationship between a network address and a response method.

DESCRIPTION OF THE PREFERRED EMBODIMENTS

Figure 1:
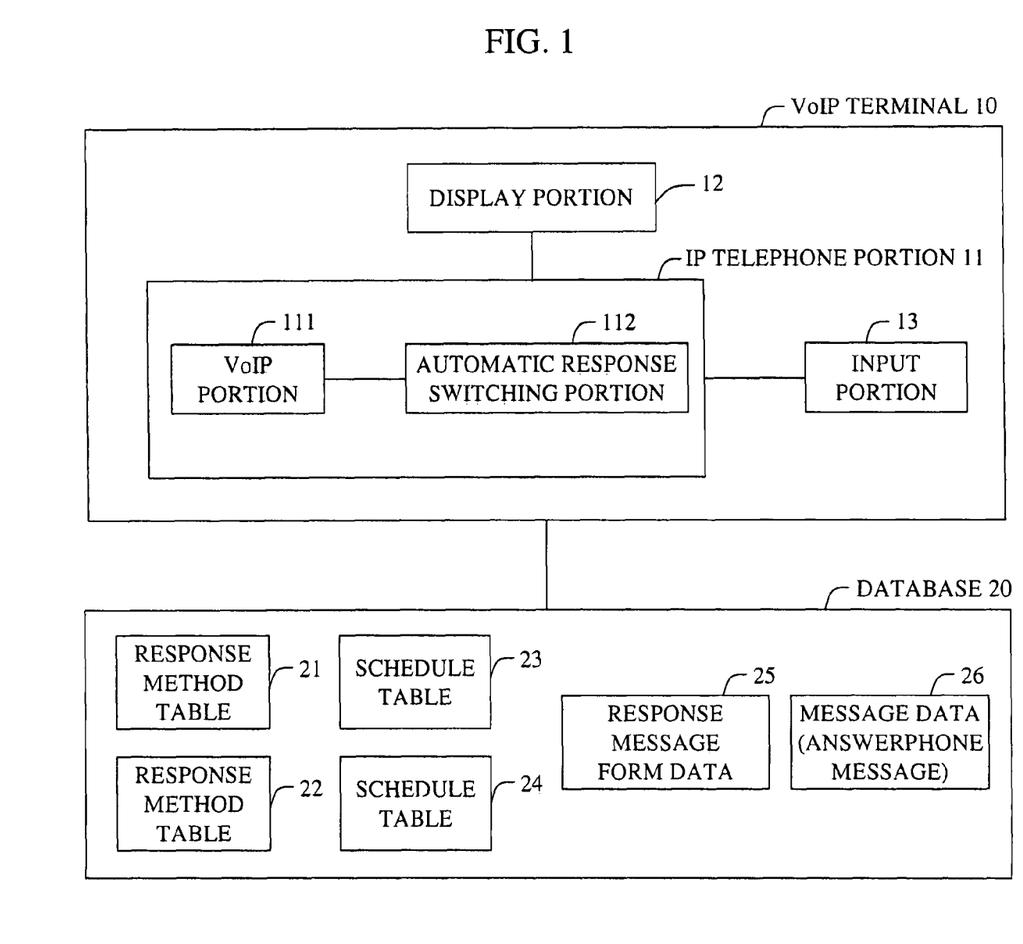
FIG. 1 shows a functional block diagram of an embodiment of an IP telephone apparatus according to the invention.

Referring to FIG. 1, an example of an IP telephone automatic response apparatus according to the invention will be described. The IP telephone automatic response apparatus in this example comprises a VoIP terminal 10 and a database 20. VoIP terminal 10 includes an IP telephone portion 11, a display portion 12 for displaying a response method which is set by the user or information from the database, and an input portion 13 for setting response methods and controlling the originating call and/or destination call on VoIP terminal 10. IP telephone portion 11 includes a VoIP portion 111 with IP telephone functions and an automatic response switching portion 112 for automatically switching the response method upon reception of a call.

Database 20 includes a first and a second response method table 21 and 22, a first and a second schedule table 23 and 24, response message form data 25, and message data (answerphone message) 26. The data registered in response message form data 25 and the data stored in message data (answerphone message) 26 may be of any data format, such as voice, text, or image, for example.

While there are shown in FIG. 1 one VoIP terminal 10 and one database 20, the IP telephone automatic response apparatus may be arranged to include a plurality of VoIP terminals 10 and one database 20. Database 20 may be of any form as long as it can be referred to by all VoIP terminals 10, and it may be installed anywhere, such as on the network, for example.

VoIP terminal 10 may be either a fixed terminal, such as a subscriber telephone or a computer, or a mobile or portable terminal such as a cellular phone or a PDA. In the following description, however, VoIP terminal 10 will be assumed to be a portable terminal.

Figure 3:
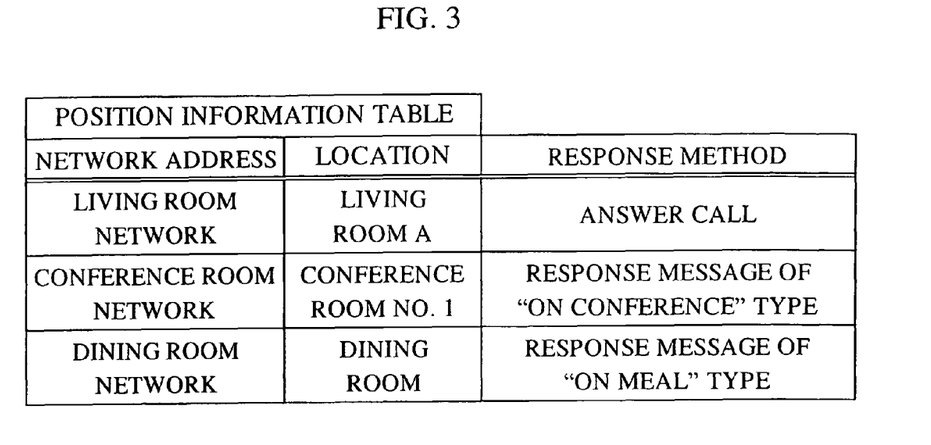
FIG. 3 shows a first example of a response method table used in the IP telephone automatic response apparatus of the invention.
Figure 4:
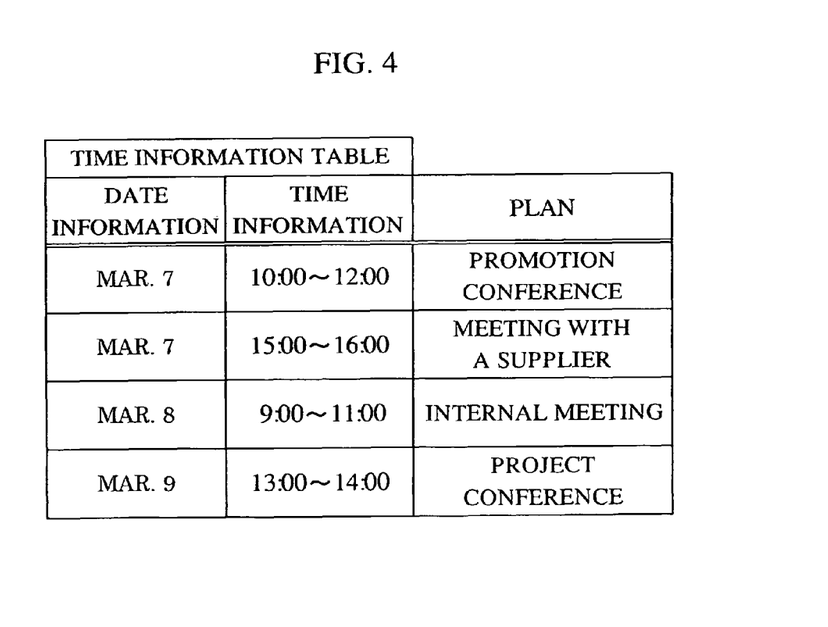
FIG. 4 shows a first example of a schedule table used in the IP telephone automatic response apparatus of the invention.
Figure 5:
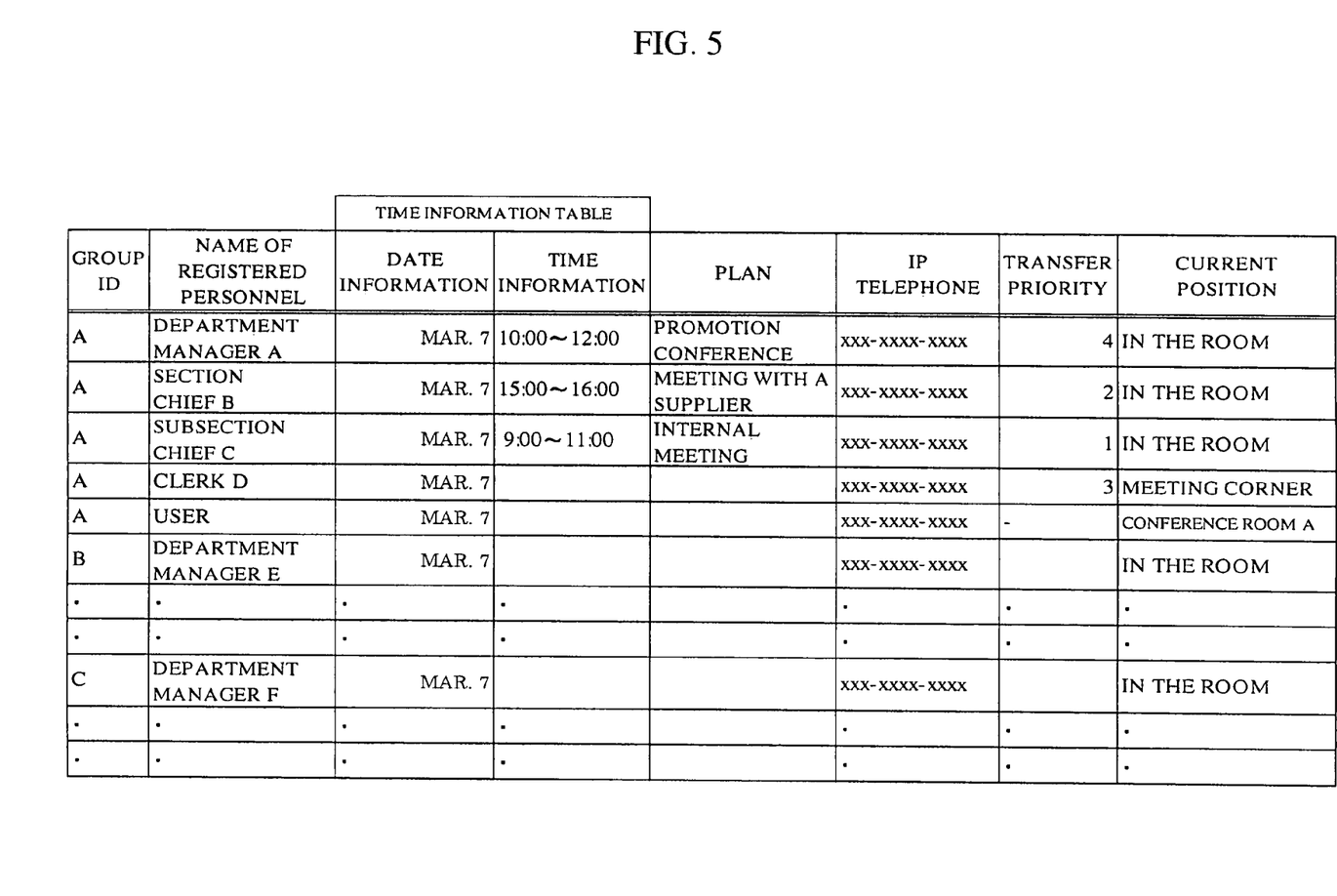
FIG. 5 shows a second example of the schedule table for a group used in the IP telephone automatic response apparatus of the invention.
Figure 7:
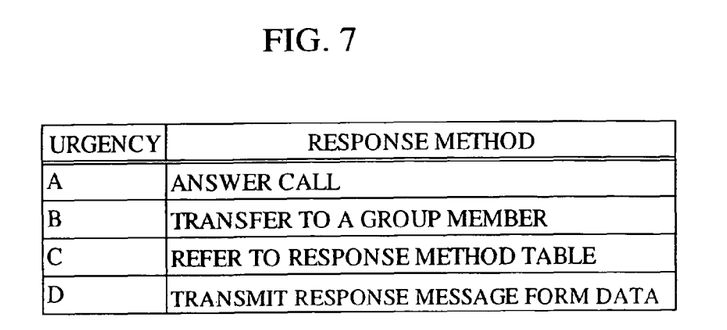
FIG. 7 shows a second example of the response method table used in the IP telephone automatic response apparatus of the invention.

In first response method table 21, relationship between a position information table and response methods is registered, as shown in FIG. 3. In second response method table 22, relationship between urgency and response methods is registered, as shown in FIG. 7. In first schedule table 23, relationship between time information tables and plans is registered, as shown in FIG. 4. In second schedule table 24, relationship between a time information table and plans and, further, group IDs and the names of registered personnel, for example, are registered, as shown in FIG. 5. In response message form data 25, message forms to be transmitted to the originating caller are registered. In message data (answerphone message) 26, messages transmitted from the originating caller are stored. The first and second response method tables 21 and 22, first and second schedule tables 23 and 24, and response message form data 25 are entered by the user in advance. Details of the response method utilizing these tables will be described below.

Figure 2:
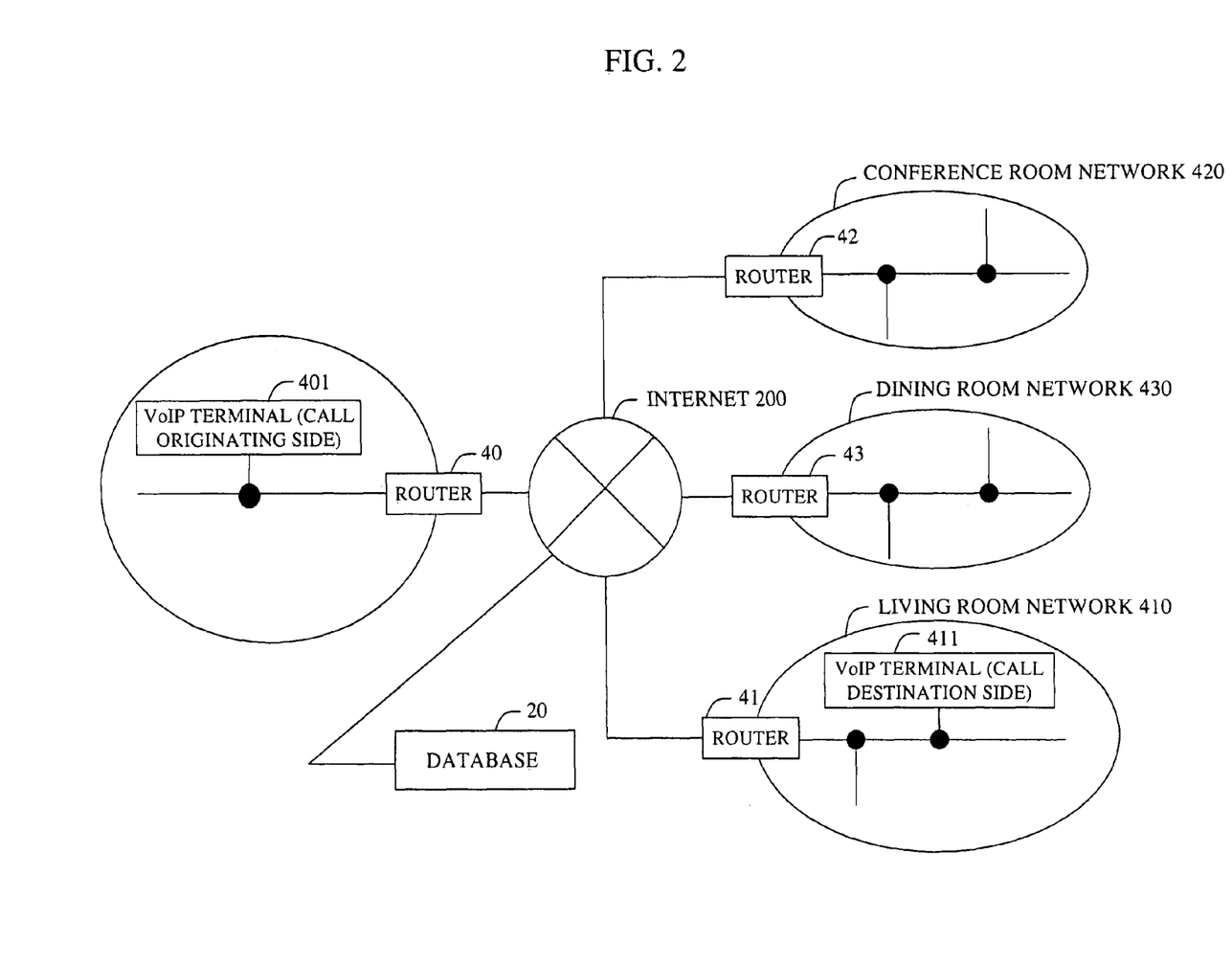
FIG. 2 shows a functional block diagram of an embodiment of an IP telephone automatic response apparatus including the IP telephone apparatus of the invention.

Referring to FIG. 2, an example of an IP telephone system utilizing the IP telephone automatic response apparatus of the invention will be described. A living room, a conference room, and a dinning room are each furnished with a network, namely a living room network 410, a conference room network 420, and a dining room network 430, respectively. The networks include routers 41, 42, and 43, respectively, through which the networks are connected to the Internet 200.

An IP address is allocated to each VoIP terminal. The IP address consists of a network address and a host address. The network address is the portion of the IP address that identifies the network, and the host addresses of which are all zero. Different network addresses are given to living room network 410, conference room network 420, and dining room network 430, respectively, so that they are identified as different network segments.

Thus, the network address indicates the position where the router is installed. The network address further indicates the current position of the VoIP terminal. The network address uniquely corresponds to the current position of the router and the VoIP terminal.

A case will be considered that a VoIP terminal 411 existing in living room network 410 is called by a VoIP terminal 401 on the call originating side. The originating call from VoIP terminal 401 is sent out via router 40 to the Internet 200, from which it is further transferred, via router 41, to VoIP terminal 411 on the call destination side. VoIP terminal 411 detects the network address based on the IP address of its own VoIP terminal 411 or VoIP terminal 401 on the call originating side. VoIP terminal 411 further refers to a database 20 to obtain a response method corresponding to the network address. Then, an automatic response switching portion 112 carries out a call reception process or call destination process in accordance with the response method.

Thus, in this example, VoIP terminal 411 on the call destination side carries out a response process in accordance with the current position of VoIP terminal 411 on the call destination side or that of VoIP terminal 401 on the call originating side.

FIG. 3 shows an example of first response method table 21, which includes a position information table and corresponding response methods on the call destination side. The position information table includes a corresponding relationship between network addresses and installed positions. As described with reference to FIG. 2, the relationship between the network address and the installation position of the router is uniquely determined. Automatic response switching portion 112 of the VoIP terminal on the call destination side extracts a response method based on the network address of the call destination side or call originating side, referring to response method table 21.

The response methods on the call destination side include "Answer the call," "Response message form," and "Refer to schedule table." The user selects from a prepared list of response methods one for each particular position, and then registers it. When "Answer the call" is set as the response method, a normal IP telephone call reception process is performed. This is the case where the call destination side is able to answer the call, for example. When "Response message form" is set as the response method, response message form data 25 stored in the database is transmitted to VoIP terminal 401 on the call originating side. This is the case where the call destination side is unable to answer the call, for example. If a message is transmitted from VoIP terminal 401 on the call originating side in response to the response message form, the content of the message is stored in message data (answerphone message) 26 in the database.

When "Refer to first schedule table" is set as the response method, automatic response switching portion 112 refers to first schedule table 23 in the database. When "Refer to second schedule table" is set as the response method, automatic response switching portion 112 refers to second schedule table 24 in the database.

Now referring to FIG. 4, an example of first schedule table 23 will be described. In this example, schedule table 23 includes a time information table and corresponding "Plans" of the destination caller. The time information consists of "Date information" and "Time information." The "plans" store schedule descriptions, such as a conference, a meeting, and so on. The "plans" may be selected from a prepared list of plans or may be prepared based on character strings entered by the user.

Automatic response switching portion 112 obtains a plan registered in the row of the date information and time information that correspond to the time of reception of the call. The obtained plan is then transmitted to VoIP terminal on the call originating side as response message data. This response message may be of any data format, such as voice, text, or image, as mentioned above. If there is no plan registered in the row of the date information and time information corresponding to the current time, automatic response switching portion 112 obtains a response method by referring to first response method table 21.

Referring now to FIG. 5, an example of second schedule table 24 will be described. Schedule table 24 of the present example differs from first schedule table 23 of FIG. 4 in that the schedules of other members as transfer destinations are also registered. Schedule table 24 includes group IDs, names of registered people, IP telephone numbers, transfer priority, and current positions, in addition to the time information table and the plan of the call destination side.

The designation "Current position" indicates a new location of the VoIP terminal as it moves into a different network. The manner in which "Current position" is set will be described later.

Automatic response switching portion 112 determines whether or not any plan for the individual destination caller is registered in the row for the date information and time information corresponding to the time of reception of a call. If no plan is registered for the individual destination caller, automatic response switching portion 112 obtains a response method by referring to first response method table 21.

If a plan is registered for the individual destination caller, first the names of registered personnel with the same group ID as the destination caller are retrieved. Then, one of those registered personnel that have no registered plan in the row of the date information and time information corresponding to the time of reception of the call is selected as the transfer destination. The name of the registered person selected as the transfer destination, the IP telephone number, transfer priority, current position, and response message form data are transmitted to VoIP terminal 401 on the call originating side.

Figure 6:
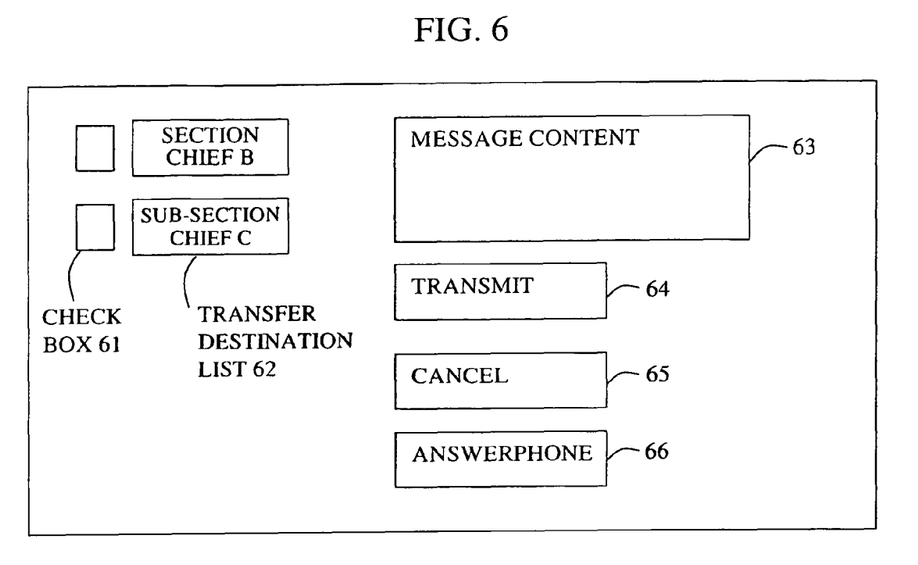
FIG. 6 shows an example of a transfer selection window on a VoIP terminal in the IP telephone automatic response apparatus of the invention.

FIG. 6 shows a transfer selection window displayed on display portion 12 of VoIP terminal 401 on the call originating side. In the transfer selection window, there are displayed a transfer destination list 62 of transfer destinations, check boxes 61 for selecting a transfer destination, response message contents 63, a transmission button 64, a cancel button 65, and a answerphone button 66. In transfer destination list 62, transfer destinations transmitted from the VoIP terminal on the call destination side are displayed from top to bottom in the order of decreasing priority. In response message contents 63, a response message transmitted from the destination caller is displayed.

As the originating caller selects the name of a registered person and presses transmission button 64, the originating call is transferred to the selected destination. The originating caller may either transmit a message by pressing answerphone button 66, or terminate the connection by pressing cancel button 65.

Referring to FIG. 7, an example of second response method table 22 will be described. Second response method table 22 is made up of urgency and corresponding response methods. Urgency is expressed by flags A, B, C, and D with decreasing order of urgency, for example. The destination caller registers response methods corresponding to the importance and/or urgency, via input portion 13. In the present example, urgency A indicates that a call should be answered, urgency B indicates that a call should be transferred, urgency C indicates that first response method table 21 should be referred to, and urgency D indicates that a response message form should be transmitted. Alternatively, the flags may be set such that a call should be answered for urgency B and higher urgency and a response message form should be transmitted for urgency C and lower urgency.

Upon making an originating call, the originating caller sets the urgency using input portion 13, such that an urgency flag is transmitted to the destination caller together with other data. Automatic response switching portion 112 on the call destination side obtains the urgency flag from the received data and extracts the response method by referring to the second response method table. A process is then performed in accordance with the extracted response method. For example, if the urgency is A, a call-answering process is performed, and if the urgency is B, a transfer process is carried out by referring to the second schedule table.

Hereafter, a method for registering the position information in the database 20 as current position information after the VoIP terminal has moved into a different network segment will be described. A new IP address is allocated to the VoIP terminal when the terminal moves into a different network segment. The current position of the VoIP terminal is obtained from the network address of the new IP address. The VoIP terminal then transmits the current position information to the database 20 again, whereby the current position data in second schedule table 24 is updated. In accordance with IPv4 (Internet Protocol Version4), when the IP address is set manually, generally the user does not know in what network segment the current position is in or if the current position has moved into a different network segment. Thus, the user transmits the current position information to the database 20 at predetermined time intervals. When the setting is such that the IP address is automatically obtained, a new IP address is distributed upon change of the network segment. Thus, the user can know when the current position has moved into a different network segment. Therefore, the current position information is transmitted to database 20 upon detection of movement. In IPv6 (Internet Protocol Version6), IP addresses can be automatically obtained, so that the current position information is transmitted to database 20 by the latter method. As a result, the current position of the user is registered as the current position in second schedule table 24.

While specific examples of the present invention have been described above, it will be understood that the invention is not limited thereto, and that changes and variations may be made without departing from the spirit or scope of the following claims.

In accordance with the invention, when a call is received, a response can be made in a desired manner depending on the position or condition of the call destination side.

In accordance with the invention, when a call is received, the method of response by the VoIP terminal on the call destination side can be automatically switched depending on the position of the VoIP terminal on the call destination side or call originating side.

What is claimed is:

1. An Internet Protocol (IP) telephone apparatus comprising:
   an input portion via which a response method for incoming calls is set and outgoing or incoming calls are controlled;
   a display portion for displaying the response method which is set via the input portion and a received message;
   a Voice over Internet Protocol (VoIP) portion for controlling voice calls according to VoIP; and
   an automatic response switching portion for selectively switching a response method upon reception of an incoming call, wherein said automatic response switching portion is adapted to selectively switch a response method by referring to a network address for a network over which the incoming call is communicated to the IP telephone apparatus and to a response method table indicating a relationship between network addresses and response methods including a normal IP telephone call reception process and at least one other process.

2. The IP telephone apparatus according to claim 1, wherein said automatic response switching portion is adapted to transmit a response message to a calling party of the incoming call based on a schedule of a called party of the incoming call, referring to a schedule table indicating a relationship between a time information table and the schedule of the called party.

3. The IP telephone apparatus according to claim 1, wherein said automatic response switching portion is adapted to transmit a list of transfer destinations to a calling party of the incoming call based on a schedule of a called party of the incoming call, referring to a schedule table indicating a relationship among a time information table, the schedule of the called party and transfer destinations, and said automatic response switching portion transfers the incoming call to a transfer destination selected by the calling party.

4. The IP telephone apparatus according to claim 2, wherein a current position of the IP telephone apparatus is detected based on the network address of an IP address, wherein the detected current position is registered in said schedule table as current position data.

5. The IP telephone apparatus according to claim 1, wherein said automatic response switching portion switches the response method depending on a flag transmitted from a calling party of the incoming call, said flag indicating importance or urgency.

6. The IP telephone apparatus according to claim 1, wherein said automatic response switching portion switches the response method by referring to said response table based on a network address of a calling party of the incoming call.

7. An Internet Protocol (IP) telephone service system comprising Voice over Internet Protocol (VoIP) terminals connected via an IP packet network, and a call control server for managing communications between said VoIP terminals, wherein at least one of said VoIP terminals is adapted to perform a call reception process by referring to a network address for a network over which an incoming call is communicated to the VoIP terminal and to a response method table indicating a relationship between network addresses and response methods including a normal IP telephone call reception process and at least one other process.

8. An Internet Protocol (IP) telephone apparatus comprising:
   an input device for setting response methods for incoming calls; and
   an automatic response switching controller for switching among the response methods based on a network address associated with an incoming call from a calling party to the IP telephone apparatus and on a response method table indicating a relationship between network addresses and response methods including a normal IP telephone call reception process and at least one other process.

9. The IP telephone apparatus according to claim 8, wherein the network address associated with the incoming call is a network address associated with the IP telephone apparatus.

10. The IP telephone apparatus according to claim 8, wherein the network address associated with the incoming call is a network address associated with an IP telephone apparatus of the calling party.

11. The IP telephone apparatus according to claim 8, wherein the automatic response switching controller switches among the response methods further based on called party schedule information.

12. The IP telephone apparatus according to claim 8, wherein the IP telephone apparatus sends a list of transfer destinations to an IP telephone apparatus of the calling party and transfers the incoming call to a transfer destination in accordance with transfer selection information received from the calling party.

13. The IP telephone apparatus according to claim 8, wherein the automatic response switching controller switches among the response methods further based on an urgency flag transmitted from the calling party.

14. The IP telephone apparatus according to claim 8, wherein the response method table is part of a database.

15. The IP telephone apparatus according to claim 14, wherein the database further comprises information that specifies a called party schedule.

16. The IP telephone apparatus according to claim 14, wherein the database further comprises call transfer information.

17. The IP telephone apparatus according to claim 14, wherein the database further comprises information that relates urgency and response methods.

18. The IP telephone apparatus according to claim 15, wherein the database is accessible to the automatic response switching controller over a network.

19. The IP telephone apparatus according to claim 8, wherein the IP telephone apparatus is portable.

* * * * *